United States Patent
Andersen et al.

(10) Patent No.: US 6,625,976 B1
(45) Date of Patent: Sep. 30, 2003

(54) THREE-WAY CONVERSION CATALYSTS AND METHODS FOR THE PREPARATION THEREFOR

(75) Inventors: Paul Joseph Andersen, Norristown, PA (US); Christopher John Bennett, Exton, PA (US); Barry John Cooper, Radnor, PA (US); Phillip Shady, Newtown, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 09/214,944

(22) PCT Filed: Jul. 17, 1997

(86) PCT No.: PCT/GB97/01944

§ 371 (c)(1),
(2), (4) Date: Feb. 8, 1999

(87) PCT Pub. No.: WO98/03251

PCT Pub. Date: Jan. 29, 1998

(30) Foreign Application Priority Data

Jul. 18, 1996 (GB) ................................................ 9615123

(51) Int. Cl.$^7$ .............................. F01N 3/10; B01J 8/02; B01J 23/58; B01J 23/42
(52) U.S. Cl. ................... 60/299; 423/213.5; 423/239.1; 423/245.1; 423/247; 502/328; 502/332; 502/333; 502/334; 502/339
(58) Field of Search .............................. 502/303, 328, 502/304, 332, 333, 334, 339, 325; 423/213.5, 247, 245.1, 239.1; 60/299

(56) References Cited

U.S. PATENT DOCUMENTS

| | | | |
|---|---|---|---|
| 4,448,895 A | * 5/1984 | Ono et al. .................. | 502/304 |
| 4,727,052 A | 2/1988 | Wan et al. .................. | 502/327 |
| 4,760,044 A | 7/1988 | Joy, III et al. .............. | 502/303 |
| 5,008,090 A | 4/1991 | Joy, III et al. .............. | 423/212 |
| 5,010,051 A | 4/1991 | Rudy ........................ | 502/304 |
| 5,057,483 A | 10/1991 | Wan .......................... | 502/304 |
| 5,081,095 A | 1/1992 | Bedford et al. ............. | 502/304 |
| 5,139,992 A | 8/1992 | Tauster et al. .............. | 502/304 |
| 5,254,519 A | 10/1993 | Wan et al. .................. | 502/252 |

FOREIGN PATENT DOCUMENTS

| | | |
|---|---|---|
| EP | 244 124 A1 | 11/1987 |
| EP | 0 337 809 A2 | 10/1989 |
| EP | 351 197 A2 | 1/1990 |
| EP | 351 197 A3 | 1/1990 |
| EP | 427 493 A2 | 5/1991 |
| EP | 0 629 771 | 12/1994 |
| EP | 1 057 983 | 12/2000 |
| GB | 1 495 637 | 12/1997 |
| WO | WO 92/05861 | 4/1992 |
| WO | WO 93/09146 | 1/1993 |
| WO | WO 93/10886 | 6/1993 |
| WO | WO 94/07600 | 4/1994 |
| WO | WO 95/00235 | 1/1995 |

OTHER PUBLICATIONS

H.C. Yao and Y. F. Yu Yao "Ceria in Automotive Exhaust Catalysts", *Journal of Catalysts 86*, pp. 254–265 (1984).
UK Search Report dated Nov. 15, 1996; Application GB 9615123.8.

* cited by examiner

Primary Examiner—Wayne A. Langel
Assistant Examiner—Jonas N. Strickland
(74) Attorney, Agent, or Firm—RatnerPrestia

(57) ABSTRACT

A platinum group metal three-way conversion catalyst composition containing a high temperature catalytic component and a low temperature catalytic component has each catalytic component present as separate distinct particles in the same washcoat layer. The catalyst composition is prepared from a washcoat slurry containing a high temperature catalyst support material, and a low temperature catalyst support material, each support material being of sufficiently large particle size so as to prevent each support material forming a solution or a sol with the liquid medium of the slurry. The platinum group metal or metals can be impregnated into each support material either after formation of the washcoat on a non-porous refractory, metallic or palletized substrate or before forming the washcoat slurry.

60 Claims, No Drawings

THREE-WAY CONVERSION CATALYSTS AND METHODS FOR THE PREPARATION THEREFOR

This application is the U.S. national-phase application of PCT International Application No. PCT/GB97/01944.

This invention relates to catalysts used to remove undesirable components in the exhaust gas from internal combustion engines. More particularly, the invention is concerned with improved catalysts of the type generally referred to as three-way conversion or TWC catalysts.

The exhaust from internal combustion engines contains hydrocarbons. carbon monoxide and nitrogen oxides which must be removed to levels established by various government regulations. The aforementioned three-way catalysts are poly-functional in that they have the capability of substantially simultaneously catalysing the oxidation of hydrocarbons and carbon monoxide and the reduction of nitrogen oxides.

Typical three-way catalysts which exhibit good catalytic activity and long life contain one or more platinum group metals (eg Pt, Pd, Rh, Ru and Ir) located upon a high surface area porous refractory oxide support, eg a high surface area alumina coating. The porous refractory oxide support is carried on a suitable non-porous refractory substrate such as a monolithic carrier comprising a refractory ceramic or metal honeycomb structure or refractory particles such as spheres, pellets or short extruded segments of a suitable refractory material.

Three-way catalysts are currently formulated with complex washcoat compositions containing stabilised alumina, an oxygen storage component (primarily stabilised ceria) and precious metal catalytic components. The term "oxygen storage component" is used to designate a material which is capable of being oxidised during oxygen-rich (lean) cycles of the exhaust gas being treated and reduced during oxygen-poor (rich) cycles of the exhaust gas being treated.

Three-way catalysts typically have been based on platinum/rhodium catalysts in preference to palladium which suffered from certain disadvantages including the high sensitivity of palladium to poisoning by sulphur and lead. However, with increased use of lead free petrol around the world, palladium is an extremely promising substitute for the traditionally used platinum/rhodium catalysts. Furthermore, the much lower cost of palladium makes it a highly desirable alternative to platinum/rhodium in three-way catalysts, provided the desired catalytic performance can be achieved.

The art has devoted a great deal of effort in attempts to improve the efficiency of palladium containing three-way catalysts. Thus, in an article in Third Int. Cong. Catal. and Auto Poll. Controls, Pre-print Vol. 1, pages 125 to 135, the authors, Dettling et al, describe the inclusion of a low temperature catalyst component ($Pd/Al_2O_3$) and a high temperature catalyst component ($Pd/CeO)_2$ in the same catalyst composition for high activity under both low and high operating temperatures.

WO 95/00235 (Engelhard Corporation) also describes a palladium containing catalyst composition containing low and high temperature catalyst components structured as two washcoat layers WO 95/07600 (Allied Signal) describes a palladium containing three-way catalyst as a single layer. However, according to the method of preparation, the finished catalyst only has the high temperature $Pd/CeO_2$ component.

U.S. Pat. Nos 4,727,052, 5,057,483, 5,008,090 and 5,010,051; GB Patent 1495637; and European Patent Applications 92302928.4 and 0427293A2 also describe three-way conversion catalysts based on platinum group metal catalytic components.

We have found that platinum group metal three-way catalysts containing a high temperature functional component and a low temperature functional component when prepared by the unique methods of the present invention exhibit greatly improved three-way catalytic activity even after extended high temperature aging.

In this specification, by high temperature functional catalytic component is meant a catalytic component which exhibits catalytic activity at higher temperatures (eg above about 500° C.) and by low temperature functional catalytic component is meant a catalytic component which exhibits catalytic activity at lower temperatures (eg in the range 200 to 400° C.)

According to the present invention there is provided a method of making a platinum group metal three-way catalyst composition which contains a high temperature catalytic component and a low temperature catalytic component with each catalytic component being present in the catalyst composition as separate distinct particles in the same washcoat layer, which method comprises:

(a) forming on a non-porous substrate a combined washcoat of a high temperature catalyst support material and a low temperature catalyst support material from a slurry in which each of the catalyst support materials is of sufficiently large particle size so as to prevent each catalyst support material from forming a solution or a sol with the liquid medium of the slurry; and (b) impregnating a platinum group metal or metals into each catalyst support material either after formation of the washcoat on the non-porous substrate or before forming the washcoat slurry.

Preferably, separate slurries of the high temperature support material and the low temperature support material are prepared and the two slurries are then blended together and coated onto the non-porous substrate.

The non-porous substrate may be a refractory ceramic or metal honeycomb structure or refractory particles such as spheres, pellets or short extruded segments of a suitable refractory material.

Further according to the present invention, the proportions of the high temperature catalytic component and the low temperature catalytic component required in the catalyst composition are determined by the respective water absorption capabilities of each catalyst support material and the respective amounts of each catalyst support material present in the washcoat.

Preferably, the water absorption capabilities of the high temperature catalyst support material and the low temperature catalyst support material are respectively 0.2 to 1.0 ml/g and 0.5 to 2.5 ml/g.

Suitably, the catalyst support materials have a mean particle size of less than 20 microns, preferably between 1 and 20 microns and more preferably about 5 microns.

The platinum group metal is selected from platinum, palladium, rhodium, ruthenium, iridium or any combination thereof.

Preferably, the high temperature catalyst support material is an oxygen storage material.

Suitable oxygen storage materials include ceria, perovskites. NiO, $MnO_2$ and $Pr_2O_3$ with stablised ceria being the preferred material.

Suitable stabilisers for ceria include zirconium, lanthanum, alumina, yttrium, praeseodymium and neodymium with zirconium being preferred.

Suitably, the zirconium stablised ceria contains 2 to 50% $ZrO_2$, a preferred composition being about 58% by weight $CeO_2$ and about 42% by weight $ZrO_2$.

Suitable low temperature catalyst support materials are stabilised alumina and unstabilised alumina.

Suitable stabilisers for alumina include lanthanum, barium and zirconium with lanthanum being preferred.

Preferably, the lanthanum stabilised alumina contains 2 to 7% lanthanum oxide.

The method of the invention may utilise a catalyst promoter, preferably selected from Nd, Ba, Ce, La, Pr, Mg, Ca and Sr with Nd and Ba being particularly suitable. The catalyst promoters may be added to the slurry or separately impregnated.

Further preferably, the method of the invention utilises a compound effective for the suppression of hydrogen sulphide emissions from the catalyst composition. Suitable such compounds include NiO, $Fe_2O_3$ and BaO with NiO being preferred.

Suitably, the method according to the invention utilises a compound which is effective in preventing preferential absorption of the platinum group metal in one or other of the high temperature or low temperature catalyst support materials. Preferred such compounds include citric acid, acetic acid and oxalic acid.

From another aspect, the present invention is a platinum group metal three-way catalyst composition made by any of the methods described above.

From yet another aspect the present invention is a platinum group metal three-way catalyst composition comprising a high temperature catalytic component and a low temperature catalytic component wherein each catalytic component is present in the catalyst composition as separate distinct particles in the same washcoat layer.

Suitably, the high temperature and low temperature catalytic components in the catalyst composition have a mean particle size of less than 20 microns, preferably between 1 and 20 microns and more preferably about 5 microns.

As can be seen from the foregoing discussion of the prior art, the concept of combining a high temperature catalytic component and a low temperature catalytic component in the same three-way conversion catalyst is known. The present invention however, enables both catalytic components to be advantageously incorporated into a single washcoat layer by utilising a unique preparation technique. This preparation technique entails incorporating two distinct and separate catalyst support materials into the same washcoat slurry so that the final catalyst composition has both the high temperature catalytic function and the low temperature catalytic function in a single washcoat layer.

A key feature of the invention is that the catalyst support materials should not be in solution in the washcoat slurry or present as very small particles as found in a sol (the order of magnitude of the size of sol particles being in the nanometer range). In order to obtain the benefits of the present invention, the insoluble catalyst support materials in the washcoat slurry preferably should have a mean particle size of at least 1 micron, more preferably about 5 microns. However, if the particle size is too large (eg greater than 20 microns) there may be difficulty in getting the washcoat to adhere to a non-porous substrate.

Another important feature of the invention is that to maintain separation of the catalyst support materials they should be ball-milled in separate slurries followed by blending of these slurries. The final blend is coated onto the non-porous substrate.

Yet another important feature of the invention is the incipient wetness water absorption capabilities of the high temperature catalyst support material and the low temperature catalyst support material because these water absorption capabilities relate not only to the process for making the catalyst composition but also to the specification of the catalyst formulation. The catalyst contains two oxide support materials, exemplified by zirconium-stabilised ceria and lanthanum-stabilised alumina, although unstabilised alumina may be used. The platinum group metal (exemplified by palladium) is split between the two oxide support materials. In one embodiment of the invention, the palladium is impregnated from an aqueous solution into the washcoat consisting of a mixture of the two oxide support materials and the way in which the palladium is split between the two oxides depends on the fraction of the aqueous impregnation solution absorbed by the respective oxides. For example, if it is required that 50% of the available palladium is to be supported on the zirconium-stabilised ceria and the other 50% of available palladium is to be supported on the lanthanum-stabilised alumina then the washcoat would be formulated so that the water absorption of the zirconium-stabilised ceria in the catalyst composition (ie (ml water absorbed/g)×(g in catalyst)) is equal to the water absorption of the lanthanum-stabilised alumina in the catalyst composition. Thus, the ratio of the oxide support materials is specified by their relative water absorptions and the absolute amounts of the oxide support materials is specified by the amount of support needed in the catalyst composition (more specifically, a certain amount of Zr-stabilised ceria is needed for adequate performance). The desired split of the palladium depends on the duty required of the catalyst composition. In some applications, equal amounts of high temperature catalytic component and low temperature catalytic component is required. In other applications, more high temperature compound than low temperature compound is required (or vice versa). For example, catalyst compositions having palladium splits ranging from (a) 27% of Pd as $Pd/ZrCeO_2$—73% of Pd as $Pd/La\ Al_2O_3$ to (b) 73% of Pd as $Pd/ZrCeO_2$—27% of Pd as $Pd/La\ Al_2O_3$ have been prepared according to the methods of the invention.

In an alternative method of making the catalyst composition, a portion of the total palladium is impregnated into a bulk form of the high temperature catalyst support material and the remaining portion of the palladium is impregnated into a bulk form of the low temperature catalyst support material prior to the formation of the washcoat slurry. Since the impregnated palladium is essentially insoluble in the washcoat it remains interacted with its associated oxide support material in the final catalyst composition. In this embodiment also, the ratio of the two oxide support materials is chosen on the basis of their relative water absorptions and the desired split between the palladium intimately interactive with, for example, the zirconium stabilised ceria and the palladium intimately interactive with the lanthaniun stabilised alumina.

Certain embodiments of the invention and the efficacy thereof are demonstrated by the following Examples.

EXAMPLE 1

La-stabilised $Al_2O_3$ with an incipient wetness water absorption of about 1.85 ml/g was slurried in water at a composition of about 55% by weight solids to form slurry A. Slurry A was then wet milled to a mean particle size of about 5 microns. Separately, bulk NiO was slurried in water at a composition of about 4% by weight solids and wet milled to a mean particle size of about 5 microns. After the NiO slurry was wet milled. Zr-stabilised ceria with an incipient wetness water absorption of about 0.5 ml/g and was added to the NiO slurry and the resulting slurry was wet milled further to a mean particle size of about 5 microns to form slurry B. Slurry A and slurry B were blended in a specific ratio (1:2.36 as dictated by the desired catalyst composition) and coated on a monolithic cordierite substrate by dipping or alternatively passing through a washcoat curtain. After blowing off the excess washcoat with compressed air, the coated substrate was then dried at 60° C. and fired at 500° C. in flowing air. The fired coated substrate was then dipped in an aqueous solution of Pd(NO$_3$)$_2$/citric acid/Nd(NO$_3$)$_3$ or alternatively passed through a curtain of the same solution and excess solution was blown off with compressed air (Impregnation 1). The Pd(NO$_3$)$_2$/citric acid/Nd(NO$_3$)$_3$ Solution was absorbed such that the quantity of solution which just filled the pores of the washcoat contained sufficient Pd and Nd to give the desired loadings. The resulting impregnated block was dried at 60° C. and fired at 500° C. in flowing air. Finally, the fired block was dipped in an aqueous solution of barium acetate (about 150 g Ba/l) or alternatively passed through a curtain of the same solution and the excess solution was blown off with compressed air (Impregnation 2). The barium acetate solution was absorbed such that the quantity of solution which just filled the washcoat contained sufficient barium to give the desired loading. Finally, the barium-impregnated block was dried at 60° C. and fired at 500° C. in flowing air.

The catalyst composition prepared in accordance with this Example 1 had the palladium split approximately 62% on the stabilised alumina and 38% on the stabilised ceria.

In a modification of this Example 1, slurry B could be prepared by co-milling NiO and Zr-stabilised ceria as opposed to pre-milling the NiO and then adding the Zr-stabilised ceria.

EXAMPLE 2

An aqueous solution of Pd(NO$_3$)$_2$ was impregnated into La-stabilised Al$_2$O$_3$ with an incipient wetness water absorption of about 1.85 ml/g and the wet powder was dried at 60° C. and fired at 500° C. in static air. The thus obtained Pd/La-stabilised Al$_2$O$_3$ powder was substituted for some or all of the La-Stabilised Al$_2$O$_3$ used to make slurry A as in Example 1. Separately, an aqueous solution of Pd(NO$_3$)$_2$ was impregnated into Zr-stabilised CeO$_2$ with an incipient wetness water absorption of about 0.5 ml/g and the resulting wet powder was dried at 60° C. and fired at 500° C. in static air. The thus obtained Pd/Zr-stabilised CeO$_2$ was substituted for some or all of the Zr-stabilised CeO$_2$ used to make slurry B as in Example 1. The rest of the catalyst preparation was identical to the method of Example 1 except that the Pd impregnation had already been carried out prior to the formation of the slurries.

NOTES:

(i) In a modified method of preparing the catalyst, barium can be included in the washcoating step by co-milling a barium compound (eg barium sulphate, barium nitrate or barium acetate) with La-stabilised Al$_2$O$_3$ during the preparation of slurry A. This change would reduce production costs by reducing the preparation from three steps to two steps.

(ii) Nitrates, acetates and chlorides are suitable impregnation salts.

(iii) The catalyst compositon may contain non-Pd-containing Zr-stabilised ceria and non-Pd-containing La-stabilised alumina.

(iv) Unstabilised ceria and unstabilised alumina can be used.

(v) The catalysts obtained in Examples 1, 2 and 3 above had the same composition, namely:

| (a) | 2.1% | Pd |
| (b) | 52.5% | Zr-stabilised CeO$_2$ |
| (c) | 23.0% | La-stabilised Al$_2$O$_3$ |
| (d) | 6.9% | Nd$_2$O$_3$ |
| (e) | 13.4% | BaO |
| (f) | 2.1% | NiO |

All percentages are weight percentages.

(vi) Other useful catalyst compositions of the invention are as follows:

|  | (A) | (B) |
| --- | --- | --- |
| Zr-stabilised CeO$_2$ | 55.8% | 51.8% |
| La-stabilised Al$_2$O$_3$ | 24.4% | 22.7% |
| Nd$_2$O$_3$ | 3.1% | 6.8% |
| BaO | 10.9% | 13.3% |
| NaO | 3.1% | 2.9% |
| Pd | 2.3% | 1.0% |
| Rh | — | 0.1% |
| Washcoat load | 0.13 g/cm$^3$ | 0.145g/cm$^3$ |

Again, all percentages are weight percentages.

(vii) As with all catalyst systems the precious metal content of the catalyst can vary widely. Also similar composition ranges with washcoat loads up to 0.274 g/cm$^3$ have been tested and found to be successful.

EXAMPLE 3

Comparative Example

This Example is directed to a comparative catalyst, not in accordance with the present invention, in which soluble ceria is present in the washcoat.

Cerium carbonate was slurried in water. A 10% excess amount of glacial acetic acid was added to this slurry to completely convert the cerium carbonate to cerium acetate. Zirconium acetate was then added to the aforementioned mixture. Finally, La-stabilised alumina and NiO were added to form a slurry with approximately 50% solids. The slurry was milled to a mean particle size of about 5 microns and coated on a smooth monolith substrate by dipping (or alternatively passing through a washcoat curtain). After blowing off the excess washcoat with compressed air, the coated substrate was then dried at 60° C. and fired at 500° C. in flowing air. This process may have to be repeated to achieve the desired washcoat loading. The fired catalyst was dipped in an aqueous solution of Pd(NO$_3$)$_2$/citric acid/Nd(NO$_3$)$_2$ (or alternatively it can be passed through a washcoat curtain of the same solution) and the excess solutions was blown off with compressed air (Impregnation 1). This impregnation solution was absorbed such that the quantity of solution which just filled the pores of the washcoat contained sufficient Pd and Nd to give the desired loadings. The resulting impregnated block was dried at 60° C. and fired at 500° C. in flowing air. Finally, the fired block was dipped in an aqueous solution of barium acetate (or alternatively it can be passed through a curtain of the same solution) and the excess solution was blown off with compressed air (Impregnation 2). The solution was absorbed such that the quantity of solution which just filled the pores of the washcoat contained sufficient barium to give the desired loading. The impregnated block was dried at 60° C. and fired at 500° C. in flowing air.

EXAMPLE 4

Test Results

Laboratory tests of the catalysts of Examples 1, 2 and 3 were conducted in the following manner.

A cylindrical core of 2.54 cm diameter and 30 mm length was cut from each of the impregnated blocks of Examples 1, 2 and 3. Each core was placed in an oven which had a controlled atmosphere capable of cycling between 1% CO/10% $H_2O$/20 ppm $SO_2$/balance $N_2$ and 0.5% $O_2$/10% $H_2O$/20 ppm $SO_2$/balance $N_2$ every five minutes. The furnace was heated to 1050° C. and held at that temperature for 12 hours. Each core was removed and tested in a laboratory reactor under lean/rich cycled conditions with the following average simulated exhaust gas composition:

| | |
|---|---|
| 200 ppm | $C_3H_8$ |
| 200 ppm | $C_3H_6$ |
| 1% | CO |
| 2000 ppm | NO |
| 0.33% | $H_2$ |
| 0.755% | $O_2$ |
| 14% | $CO_2$ |
| 10% | $H_2O$ |
| balance | $N_2$ | with a total flow rate of 23.8 SLPM. After establishing this inlet gas composition, the inlet gas temperature was raised to 550° C. and the total HC, CO and NOx percentage conversions were measured. The temperature was then lowered to 450° C. and the conversions were measured again, and finally the temperature was lowered to 350° C. and the conversions were measured yet again.

TABLE

| | 550° C. | | | 450° C. | | | 350° C. | | |
|---|---|---|---|---|---|---|---|---|---|
| Catalyst | HC | CO | $NO_x$ | HC | CO | $NO_x$ | HC | CO | $NO_x$ |
| Example 1 | 72 | 79 | 63 | 68 | 75 | 58 | 46 | 53 | 35 |
| Example 2 | 66 | 87 | 59 | 59 | 71 | 47 | 41 | 49 | 31 |
| Example 3 | 63 | 68 | 52 | 59 | 61 | 45 | 38 | 41 | 28 |

What is claimed is:

1. A method of making a platinum group metal three-way catalyst composition which comprises a high temperature catalytic component, a low temperature catalytic component, and an oxygen storage material wherein each catalytic component is present in the catalyst composition as separate distinct particles in a single layer and the oxygen storage material comprises a particulate support material for the high temperature catalytic component, and wherein the high temperature catalytic component exhibits enhanced catalytic activity at temperatures above 500° C. and the low temperature catalytic component exhibits enhanced catalytic activity at temperatures in the range of 200 to 400° C., the method comprising:

(a) forming on a non-porous substrate a combined washcoat of a high temperature catalyst support material and a low temperature catalyst support material from a slurry in which each of the catalyst support materials is of sufficiently large particle size so as to prevent each catalyst support material from forming a solution or a sol with the liquid medium of the slurry, wherein the high temperature catalyst support material comprises the oxygen storage material which comprises the particulate support material; and (b) impregnating a platinum group metal or metals into each catalyst support material either by adding the platinum group metal or metals to the slurry of the high temperature catalyst support material and the low temperature catalyst support material before forming the combined washcoat on the non-porous substrate or by applying the platinum group metal or metals to the washcoat after formation of the washcoat on the non-porous substrate, wherein the high temperature catalytic component comprises a first platinum group metal or metals that is supported on the oxygen storage material and the low temperature catalytic component comprises a second platinum group metal or metals that is supported on the low temperature catalytic support material, wherein the second platinum group metal or metals is the same as or different from the first platinum group metal or metals and wherein the amounts of high temperature and low temperature catalyst support materials present in the catalyst composition are determined by the amount of platinum group metal or metals required in each support material and the ratio of the high temperature catalyst support material to the low temperature catalyst support material is determined by the respective incipient water absorption capability of each catalyst support material wherein the water absorption capabilities of the high temperature catalyst support material and the low temperature catalyst support material are respectively 0.2 to 1.0 ml/g and 0.5 to 2.5 ml/g.

2. A method as claimed in claim 1 wherein the catalyst support materials have a mean particle size of less than 20 microns.

3. A method as claimed in claim 2 wherein the mean particle size of the catalyst support materials is about 5 microns.

4. A method as claimed in claim 1 wherein separate slurries of the high temperature support material and the low temperature support material are prepared and the two slurries are then blended together and coated onto the non-porous substrate.

5. A method as claimed in claim 1 wherein the first and second platinum group metal or metals are selected from the group consisting of platinum, palladium, rhodium, iridium and combinations thereof.

6. A method as claimed in claim 1 wherein the oxygen storage material is selected from the group consisting of ceria, a perovskite, NiO, $MnO_2$ and $Pr_2O_3$.

7. A method as claimed in claim 1 wherein the oxygen storage material is stabilized with a stabilizer selected from the group consisting of zirconium, lanthanum, alumina, yttrium, praseodymium and neodymium.

8. A method as claimed in claim 7 wherein the oxygen storage material comprises ceria and the stabilizer comprises zirconium.

9. A method as claimed in claim 8 wherein the zirconium stabilized ceria contains 2 to 50% by weight of zirconium oxide.

10. A method as claimed in claim 9 wherein the zirconium stabilized ceria has a composition of about 58 % by weight of $CeO_2$ and about 42 % by weight of $ZrO_2$.

11. A method according to claim 1 wherein the low temperature catalyst support material is one of a stabilized and unstabilized alumina.

12. A method as claimed in claim 11 wherein the low temperature catalyst support material is stabilized alumina and the stabilizer for the alumina is selected from the group consisting of lanthanum, barium and zirconium.

13. A method as claimed in claim 12 wherein the stabilizer is lanthanmun and the lanthanum stabilized alumina contains 2 to 7% by weight of lanthanum oxide.

14. A method as claimed in claim 1 which utilizes a catalyst promoter.

15. A method as claimed in claim 14 wherein the catalyst promoter is selected from the group consisting of neodymium, barium, cerium, lanthanum, praseodymium, magnesium, calcium and strontium.

16. A method as claimed in claim 1 which utilizes a compound effective for the suppression of hydrogen sulfide emissions from the catalyst composition which compound is selected from the group consisting of NiO, $Fe_2O_3$, CaO and BaO.

17. A method as claimed in claim 1 which utilizes a compound which is effective in preventing preferential absorption of the platinum group metal in one or other of the high temperature or low temperature catalyst support materials which compound is selected from the group consisting of citric acid, acetic acid and oxalic acid.

18. A platinum group metal three-way catalyst composition prepared by the method of claim 1.

19. A method as claimed in the claim 1, wherein the impregnating step is carried out by adding the platinum group metal or metals to the slurry of the high temperature catalyst support material and the low temperature catalyst support material before forming the combined washcoat on the non-porous substrate.

20. A method as claimed in the claim 1, wherein the impregnating step is carried out by applying the platinum group metal or metals to the washcoat after formation of the washcoat on the non-porous substrate.

21. A platinum group metal three-way catalyst composition comprising a high temperature catalytic component having enhanced catalytic activity at temperatures above 500° C., a low temperature catalytic component having enhanced catalytic activity at temperatures in the range of 200 to 400° C., and an oxygen storage material having a water absorption capability of 0.2 to 1.0 ml/g, wherein each catalytic component is present in the catalyst composition as separate distinct particles in a single layer, wherein said high temperature catalytic component comprises a first platinum group metal or metals that is supported on said oxygen storage material and said low temperature catalytic component comprises a second platinum group metal or metals that is supported on a low temperature catalytic support material having a water absorption capability of 0.5 to 2.5 ml/g, and wherein said second platinum group metal or metals is the same as or different from said first platinum group metal or metals, wherein the amounts of said high temperature and low temperature catalyst support materials in said catalyst composition are determined by the amount of platinum group metal or metals required in each catalyst support material, wherein said oxygen storage material comprises a particulate support material for said high temperature catalytic component.

22. A catalyst composition as claimed in claim 21 wherein the high temperature and low temperature catalytic components have a mean particle size of less than 20 microns.

23. A catalyst composition as claimed in claim 23 wherein the mean particle size of the catalytic components is about 5 microns.

24. A catalyst composition as claimed in claim 21 wherein said oxygen storage material is impregnated with said first platinum group metal or metals.

25. A catalyst composition as claimed in claim 24 wherein said oxygen storage material is selected from the group consisting of ceria, a perovskite, NiO, $MnO_2$ and $Pr_2O_3$.

26. A catalyst composition as claimed in claim 25 wherein the oxygen storage material is a stabilized ceria.

27. A catalyst composition as claimed in claim 26 wherein the oxygen storage material is zirconium stabilized ceria.

28. A catalyst composition as claimed in claim 27 wherein the zirconium stabilized ceria contains 2 to 50% by weight of zirconium oxide.

29. A catalyst composition as claimed in claim 28 wherein the zirconium stabilized ceria has a composition of about 58% by weight $CeO_2$ and 42% by weight $ZrO_2$.

30. A catalyst composition as claimed in claim 21 wherein the low temperature catalytic component is a stabilized or unstabilized alumina impregnated with a platinum group metal or metals.

31. A catalyst composition as claimed in claim 32 wherein the stabilizer for the alumina is selected from the group consisting of lanthanum, barium and zirconium.

32. A catalyst composition as claimed in claim 31 wherein the lanthanum stabilized alumina contains 2 to 7% by weight lanthanum oxide.

33. A catalyst composition as claimed in claim 21 wherein the platinum group metal is selected from the group consisting of platinum, palladium, rhodium, ruthenium, iridium, and any combination thereof.

34. A catalyst composition as claimed in claim 21 further comprising a catalyst promoter.

35. A catalyst composition as claimed in claim 34 wherein said catalyst promoter is selected from the group consisting of neodymium, barium, cerium, lanthanum, praseodymium, magnesium, calcium and strontium.

36. A catalyst composition as claimed in claim 21 further comprising a compound effective for the suppression of emissions of hydrogen sulfide from said catalyst composition wherein said compound is selected from the group consisting of NiO, $Fe_2O_3$, CaO and BaO.

37. An engine whose exhaust apparatus contains the catalyst defined in claim 21.

38. A catalyst composition according to claim 21, further comprising a non-porous substrate on which the washcoat layer is formed.

39. A catalyst composition according to claim 21, further comprising a non-porous substrate on which the washcoat layer is formed.

40. A method of reducing levels of hydrocarbons, carbon monoxide, and nitrogen oxides in an exhaust gas from an internal combustion engine comprising contacting the exhaust gas with a platinum group metal three-way catalyst composition comprising a high temperature catalytic component having enhanced catalytic activity at temperatures above 500° C., a low temperature catalytic component having enhanced catalytic activity at temperatures in the range of 200 to 400° C., and an oxygen storage material having a water absorption capability of 0.2 to 1.0 ml/g, wherein each catalytic component is present in the catalyst composition as separate distinct particles in a single layer, wherein said high temperature catalytic component comprises a first platinum group metal or metals that is supported on said oxygen storage material and said low temperature catalytic component comprises a second platinum group metal or metals that is supported on a low temperature catalytic support material having a water absorption capability of 0.5 to 2.5 ml/g, and wherein said second platinum group metal or metals is the same as or different from said first platinum group metal or metals, wherein the amounts of said oxygen storage material and said low temperature catalyst support material in the catalyst composition are determined by the amount of platinum group metal or metals required in each catalyst support material, wherein said oxygen storage material comprises a particulate support material for said high temperature catalytic component.

41. The method as claimed in claim 40 wherein the high temperature and low temperature catalytic components have a mean particle size of less than 20 microns.

42. The method as claimed in claim 41 wherein the mean particle size of the catalytic components is about 5 microns.

43. The method as claimed in claim 40 wherein said oxygen storage material is impregnated with said first platinum group metal or metals.

44. The method as claimed in claim 43 wherein said oxygen storage material is selected from the group consisting of ceria, a perovskite, NiO, $MnO_2$ and $Pr_2O_3$.

45. The method as claimed in claim 44 wherein the oxygen storage material is a stabilized ceria.

46. The method as claimed in claim 45 wherein the oxygen storage material is zirconium stabilized ceria.

47. The method as claimed in claim 46 wherein the zirconium stabilized ceria contains 2 to 50% by weight of zirconium oxide.

48. The method as claimed in claim 47 wherein the zirconium stabilized ceria has a composition of about 58 % by weight $CeO_2$ and 42% by weight $ZrO_2$.

49. The method as claimed in claim 40 wherein the low temperature catalytic component is a stabilized or unstabilized alumina impregnated with a platinum group metal or metals.

50. The method as claimed in claim 49 wherein the stabilizer for the alumina is selected from the group consisting of lanthanum, barium and zirconium.

51. The method as claimed in claim 49 wherein the lanthanum stabilized alumina contains 2 to 7% by weight lanthanum oxide.

52. The method as claimed in claim 40 wherein the platinum group metal is selected from platinum, palladium, rhodium, ruthenium, iridium, and any combination thereof.

53. The method as claimed in claim 40 further comprising a catalyst promoter.

54. A catalyst composition as claimed in claim 53 wherein the catalyst promoter is selected from the group consisting of Nd, Ba, Ce, La, Pr, Mg, Ca and Sr.

55. A catalyst composition as claimed in the claim 40 which contains a compound effective for the suppression of emissions of hydrogen sulphide from the group consisting of the catalyst composition which compound is selected from NiO, $Fe_2O_3$, CaO or BaO.

56. A catalyst composition comprising a material impregnated with a first platinum group metal or metals and alumina having a water absorption capability of 0.5 to 2.5 ml/g impregnated with a second platinum group metal or metals, wherein said material is selected from the group consisting of ceria, stabilized ceria, a perovskite, NiO, $MnO_2$ and $Pr_2O_3$ and has a water absorption capability of 0.2 to 1.0 ml/g and said second platinum group metal or metals is the same as or different from said first platinum group metal or metals, wherein each of said material and said alumina is present in said catalyst composition as separate distinct particles in a single layer, wherein the amounts of said material and said alumina in said catalyst composition are determined by the amount of platinum group metal or metals present in each of said material and said alumina, wherein said catalyst composition further comprises a catalyst promoter comprising barium.

57. A catalyst composition as claimed in claim 56 wherein said material comprises stabilized ceria and said ceria is stabilized by a stabilizer selected from the group consisting of zirconium, lanthanum, alumina, yttrium, praseodymium and neodymium.

58. A catalyst composition comprising a material impregnated with a first platinum group metal or metals and alumina having a water absorption capability of 0.5 to 2.5 ml/g impregnated with a second platinum group metal or metals, wherein said material is selected from the group consisting of ceria, stabilized ceria, a perovskite, NiO, $MnO_2$ and $Pr_2O_3$ and has a water absorption capability of 0.2 to 1.0 ml/g and said second platinum group metal or metals is the same as or different from said first platinum group metal or metals, wherein each of said material and said alumina is present in said catalyst composition as separate distinct particles in a single layer, wherein the amounts of said material and said alumina in the catalyst composition are determined by the amount of platinum group metal or metals present in each of said material and said alumina, wherein said catalyst composition further comprises a catalyst promoter comprising magnesium.

59. A catalyst composition as claimed in claim 58 wherein said material comprises stabilized ceria and said ceria is stabilized by a stabilizer selected from the group consisting of zirconium, lanthanum, alumina, yttrium, praseodymium and neodymium.

60. A catalyst composition comprising $MnO_2$ having a water absorption capability of 0.2 to 1.0 ml/g impregnated with a first platinum group metal or metals and alumina having a water absorption capability of 0.5 to 2.5 ml/g impregnated with a second platinum group metal or metals, wherein said second platinum group metal or metals is the same as or different from said first platinum group metal or metals and each of said $MnO_2$ and said alumina is present in said catalyst composition as separate distinct particles in a single layer, wherein the amounts of said $MnO_2$ and said alumina in said catalyst composition are determined by the amount of platinum group metal or metals present in each of said $MnO_2$ and said alumina.

* * * * *

UNITED STATES PATENT AND TRADEMARK OFFICE
CERTIFICATE OF CORRECTION

PATENT NO.   : 6,625,976 B1
DATED        : September 30, 2003
INVENTOR(S)  : Andersen et al.

It is certified that error appears in the above-identified patent and that said Letters Patent is hereby corrected as shown below:

Title page,
Item [56], References Cited, FOREIGN PATENT DOCUMENTS,
delete "EP  244 124 A1  11/1987" and insert therefor -- EP  244 127 A1  11/1987 --.
delete "GB  1 495 637  12/1997" and insert therefor -- GB  1 495 637 12/1977 --.
delete "WO  WO 93/09146  1/1993" and insert therefor -- WO  WO 93/09146 5/1993 --.
Item [57], ABSTRACT,
Line 13, delete "palletized" and insert therefor -- pelletised --.

Column 10,
Line 35, delete "39. A catalyst composition according to claim 21, further comprising a non-porous substrate on which the washcoat layer is formed."

Column 11,
Lines 30 and 40, after "from", insert -- the group consisting of --.
Line 39, after "from", delete "the group consisting of".

Signed and Sealed this

Sixth Day of July, 2004

JON W. DUDAS
*Acting Director of the United States Patent and Trademark Office*